US012789895B2

(12) United States Patent
Ito

(10) Patent No.: US 12,789,895 B2
(45) Date of Patent: Nov. 10, 2026

(54) SUSPENSION MEMBER STRUCTURE

(71) Applicant: TOYOTA JIDOSHA KABUSHIKI KAISHA, Toyota (JP)

(72) Inventor: Takahiro Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/393,206

(22) Filed: Nov. 18, 2025

(65) Prior Publication Data

US 2026/0152233 A1 Jun. 4, 2026

(30) Foreign Application Priority Data

Dec. 3, 2024 (JP) ................................ 2024-210681

(51) Int. Cl.
*B62D 21/02* (2006.01)

(52) U.S. Cl.
CPC .................................... *B62D 21/02* (2013.01)

(58) Field of Classification Search
CPC ...... B62D 25/082; B62D 21/11; B62D 21/02; B60G 2206/60; B60G 2204/18
See application file for complete search history.

(56) References Cited

U.S. PATENT DOCUMENTS 5,879,026 A * 3/1999 Dostert ................ B60G 99/004 180/311
6,003,897 A * 12/1999 Dostert ................ B60G 99/004 248/638
8,033,557 B2 * 10/2011 Dundon ................ B60G 7/001 280/124.135
10,378,418 B2 * 8/2019 Rodecker ............ F01N 13/1844
11,668,368 B2 * 6/2023 Tada ...................... F16F 1/362 188/381
2002/0074760 A1 * 6/2002 Eshelman ............ B60G 13/008 280/124.145

(Continued)

FOREIGN PATENT DOCUMENTS

JP 2012041009 A * 3/2012
KR 20170124730 A * 11/2017 ............ B62D 21/11

OTHER PUBLICATIONS

Translation of JP-2012041009-A (Year: 2012).*
Translation of KR-20170124730-A (Year: 2017).*

*Primary Examiner* — Jason D Shanske
*Assistant Examiner* — Shams Dhanani
(74) *Attorney, Agent, or Firm* — SoraIP, Inc.

(57) ABSTRACT

A suspension member structure includes a suspension member and a motor mount. The suspension member includes a pair of side member portions, and motor mount attaching holes that are opened in respective side member portions. The motor mount is press-fit into the motor mount attaching holes from an outer side in a vehicle width direction. Stepped portions with differences in height in the vehicle width direction are fashioned at peripheral edge portions of the motor mount attaching holes, at portions of the side member portions on an inward side in the vehicle width direction. A front-side flat face portion and a rear-side flat face portion are provided on both sides across the stepped portions at the peripheral edge portions of the motor mount attaching holes, each facing in a direction orthogonal to a direction in which the motor mount is press-fit into the motor mount attaching holes.

2 Claims, 4 Drawing Sheets

(56) References Cited

U.S. PATENT DOCUMENTS

| | | | | |
|---|---|---|---|---|
| 2016/0152270 | A1 * | 6/2016 | Kondo | B62D 21/00 280/124.109 |
| 2026/0131645 | A1 * | 5/2026 | Ito | B60K 1/00 |

* cited by examiner

SUSPENSION MEMBER STRUCTURE

CROSS-REFERENCE TO RELATED APPLICATION

This application claims priority to Japanese Patent Application No. 2024-210681 filed on Dec. 3, 2024. The disclosure of the above-identified application, including the specification, drawings, and claims, is incorporated by reference herein in its entirety.

BACKGROUND

1. Technical Field

The present disclosure relates to a suspension member structure.

2. Description of Related Art

Japanese Unexamined Patent Application Publication No. 2012-041009 (JP 2012-041009 A) discloses a vehicle rear portion structure that is equipped with motors that each independently drive right and left rear wheels. A rear portion of a vehicle that is described in this document includes a pair of right and left rear side frames extending in a front-rear direction of the vehicle, a pair of right and left motors that each independently drive the right and left rear wheels, a motor mounting member for attaching the right and left motors to a vehicle body, and a crossmember extending in a vehicle width direction rearward from the right and left motors. A rear portion of the motor mounting member is linked to the crossmember, and also a front portion thereof is linked to the right and left rear side frames. Thus, the right and left motors are attached to the vehicle body via the motor mounting members.

SUMMARY

Now, in a configuration in which a motor is supported on a suspension member via a motor mount, and also the motor mount is attached to the suspension member by press-fitting, it is desirable to be able to press-fit the motor mount into the suspension member in a stable orientation.

The present disclosure has been made in consideration of the above circumstances, and an object thereof is to provide a suspension member structure that enables a motor mount to be press-fit into the suspension member in a stable orientation.

A suspension member structure according to a first aspect includes a suspension member that includes a pair of side member portions extending in a vehicle front-rear direction on both sides in a vehicle width direction, and attaching holes that are opened in and that pass through respective side member portions in the vehicle width direction, and a motor mount that is attached to the suspension member in a state in which the motor mount is press-fit into the attaching holes from an outer side in the vehicle width direction and that supports a motor, in which stepped portions with differences in height in the vehicle width direction are fashioned at peripheral edge portions of the attaching holes, at portions of the side member portions on an inward side in the vehicle width direction, and flat face portions are provided on both sides across the stepped portions at the peripheral edge portions of the attaching holes, the flat face portions each facing in a direction orthogonal to a direction in which the motor mount is press-fit into the attaching holes.

In the suspension member structure according to the first aspect, the stepped portions with the differences in height in the vehicle width direction are fashioned at the peripheral edge portions of the attaching holes, at the portions of the side member portions that make up part of the suspension member on the inward side in the vehicle width direction. Also, the flat face portions are provided on both of the sides across the stepped portions at the peripheral edge portions of the attaching holes, facing in the direction that is orthogonal to the direction in which the motor mount is press-fit into the attaching holes. According to this configuration, a load that is applied when the motor mount is press-fit into the attaching holes can be borne by abutting a jig or the like against each of the flat face portions that are formed on both sides across the stepped portions at the peripheral edge portions of the attaching holes. This enables the motor mount to be press-fit into the suspension member in a stable orientation.

With the suspension member structure according to a second aspect, in the suspension member structure according to the first aspect, as viewed from the inward side in the vehicle width direction, the flat face portion that is fashioned on one side at the peripheral edge portions of the attaching holes, with the stepped portions interposed between, is fashioned in a letter C shape that follows along the peripheral edge portions of the attaching holes, and the flat face portion that is fashioned on another side at the peripheral edge portions of the attaching holes, with the stepped portions interposed between, is fashioned in a letter C shape that follows along the peripheral edge portions of the attaching holes.

In the suspension member structure according to the second aspect, the flat face portion that is fashioned on one side at the peripheral edge portions of the attaching holes, with the stepped portions interposed between, is fashioned in a letter C shape that follows along the peripheral edge portions of the attaching holes. Also, the flat face portion that is fashioned on the other side at the peripheral edge portions of the attaching holes, with the stepped portions interposed between, is fashioned in a letter C shape that follows along the peripheral edge portions of the attaching holes. In this configuration, the area of the flat portion can be suppressed from being large, as compared to a configuration in which each of the flat face portions is not fashioned in a letter C shape that follows along the peripheral edge portion of the attaching hole. As a result, for example, working time required to form the shapes of the flat face portions by machining can be suppressed from increasing.

The suspension member structure according to the present disclosure has an excellent effect of enabling the motor mount to be press-fit into the suspension member in a stable orientation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A rear portion 10 of a vehicle to which a suspension member structure according to an embodiment of the present disclosure is applied will be described with reference to FIGS. 1 to 4. Note that with respect to arrows included in each of the drawings as appropriate, arrow FR indicates a forward side in the vehicle, arrow UP indicates an upward side in the vehicle, arrow LH indicates a leftward side in a vehicle width direction (right-left direction), and arrow RH indicates a rightward side in the vehicle width direction (right-left direction). Also, when front-rear, up-down, or right-left directions are indicated in the following description, these refer to front-rear in a front-rear direction of the vehicle, up-down in an up-down direction of the vehicle, and right-left in the right-left direction of the vehicle, unless specifically stated otherwise.

Figure 1:
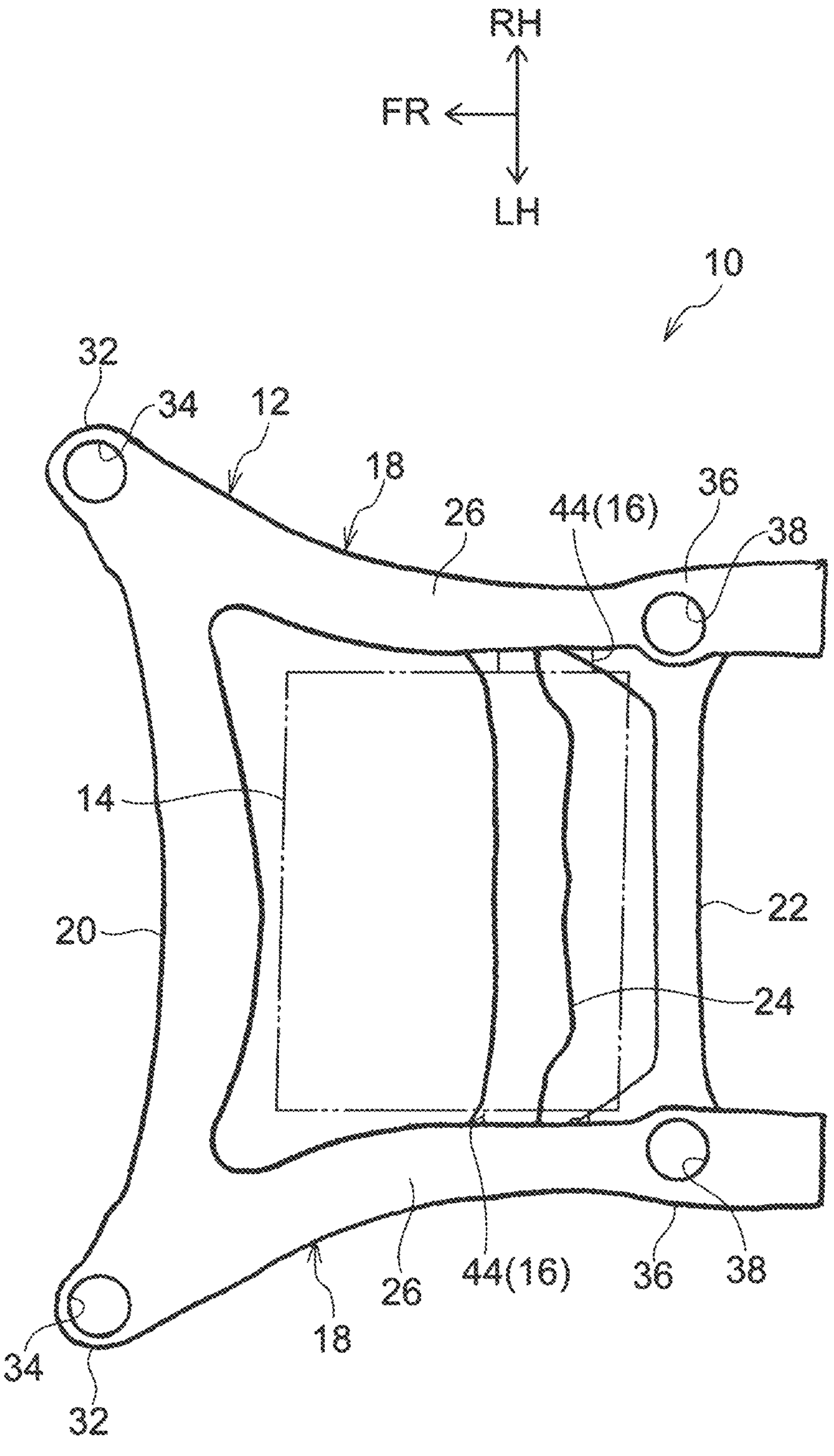
FIG. 1 is a plan view illustrating a suspension member and so forth.
Figure 2:
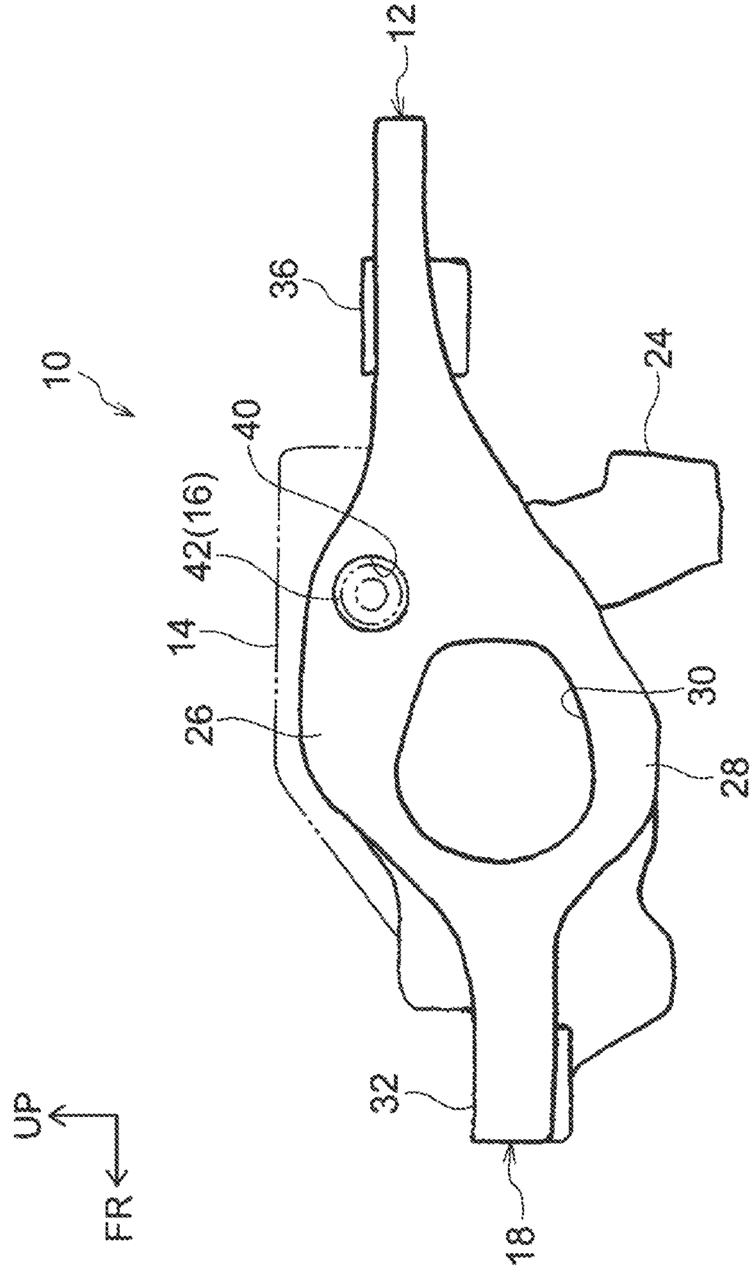
FIG. 2 is a side view illustrating the suspension member and so forth.

As illustrated in FIGS. 1 and 2, a suspension member 12 is provided at the rear portion 10 of the vehicle to which the suspension member structure of the present embodiment is applied. Various arms and so forth, which support right and left rear wheels that are omitted from illustration, are attached to this suspension member 12. Note that in FIGS. 1 and 2, portions of the suspension member 12 to which various arms and so forth are attached are omitted from illustration. Also, a motor 14 for driving the right and left rear wheels is supported by the suspension member 12 via a motor mount 16.

In one example, the suspension member 12 is formed by aluminum die casting or the like, and has a configuration in which the portions, which are described below, are integrally formed. This suspension member 12 includes a pair of right and left side member portions 18 extending in the front-rear direction, on both sides in the vehicle width direction, and a front-side crossmember portion 20 connecting front end portions of the right and left side member portions 18 in the right-left direction. Also, the suspension member 12 includes a rear-side crossmember portion 22 that connects rear-end sides of the right and left side member portions 18 in the left-right direction, and an intermediate crossmember portion 24 that connects intermediate portions in the front-rear direction of the right and left side member portions 18 in the right-left direction.

As illustrated in FIG. 1, the shapes of the right and left side member portions 18 as viewed from above in ranges from middle portions to the front end portions in the front-rear direction are gently curved outward in the vehicle width direction toward the forward side. As illustrated in FIG. 2, the intermediate portions in the front-rear direction of the right and left side member portions 18 include upper-side intermediate member portions 26 extending in the front-rear direction, and lower-side intermediate member portions 28 extending in the front-rear direction downward from the upper-side intermediate member portions 26. Between the upper-side intermediate member portions 26 and the lower-side intermediate member portions 28, openings 30 are formed, through which drive shafts for transmitting rotations of the motor 14 to the rear wheels can pass in the right-left direction.

As illustrated in FIGS. 1 and 2, the right and left side member portions 18 have front-side fixing portions 32 that are provided at the front end portions thereof, which are fixed to a vehicle body that is omitted from illustration. The front-side fixing portions 32 each have a mount member attaching hole 34 that is formed therein, into which a mount member that is omitted from illustration is attached by press-fitting or the like. The mount members that are attached to the mount member attaching holes 34 are fixed to the vehicle body, whereby the front-side fixing portions 32 are fixed to the vehicle body.

Rear-side fixing portions 36 that are fixed to the vehicle body, omitted from illustration, are provided on the rear-end sides of the right and left side member portions 18. The rear-side fixing portions 36 each have a mount member attaching hole 38 formed therein, into which a mount member that is omitted from illustration is attached by press-fitting or the like. The mount members that are attached to the mount member attaching holes 38 are fixed to the vehicle body, whereby the rear-side fixing portions 36 are fixed to the vehicle body.

As illustrated in FIG. 1, the shape of the front-side crossmember portion 20 as viewed from above has a shape that curves gradually rearward toward the middle portion in the vehicle width direction. The front-side crossmember portion 20 is suspended between the front-side fixing portions 32 of the right and left side member portions 18. The rear-side crossmember portion 22 is also suspended between the rear-side fixing portions 36 of the right and left side member portions 18. Further, as illustrated in FIGS. 1 and 2, the intermediate crossmember portion 24 is suspended between rear end portions of the lower-side intermediate member portions 28 of the right and left side member portions 18.

Figure 3:
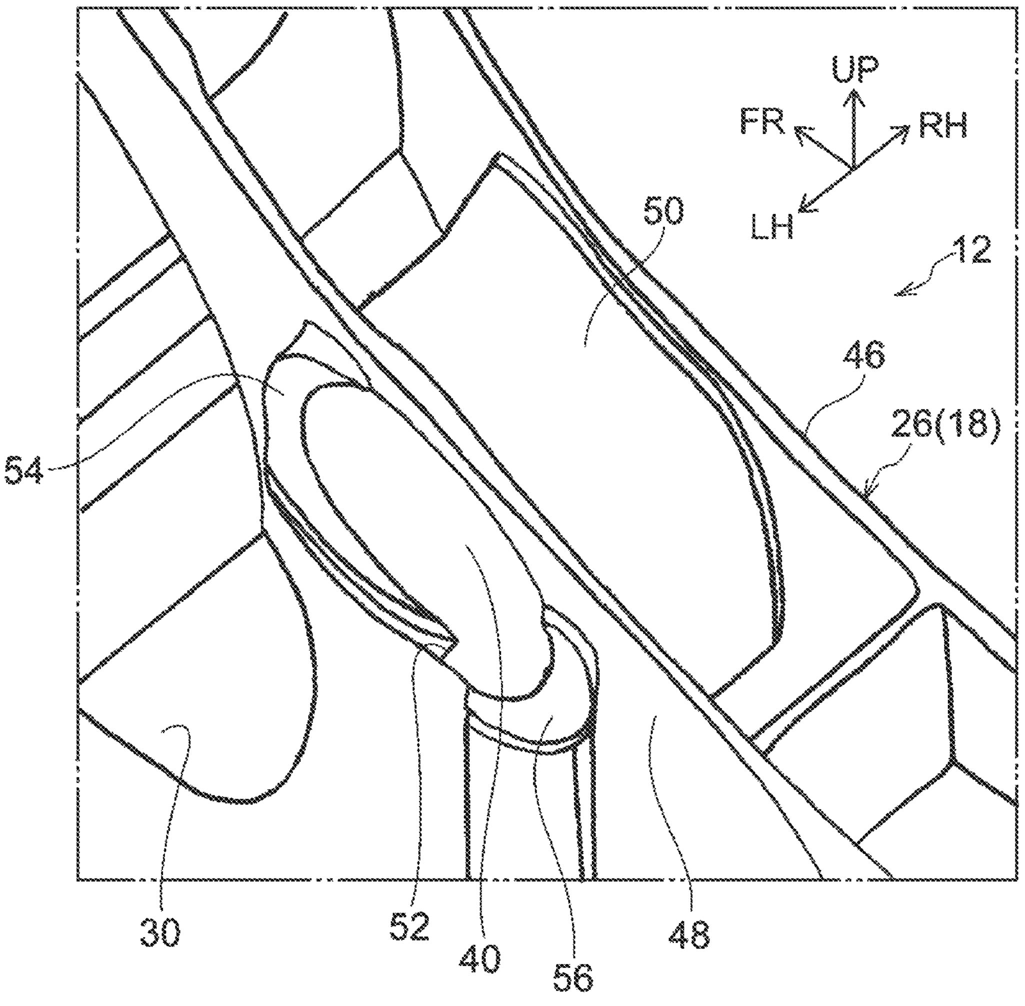
FIG. 3 is an enlarged perspective view of a portion of a side member portion on a right side, in which an attaching hole is formed, as viewed from an inward side in a vehicle width direction.
Figure 4:
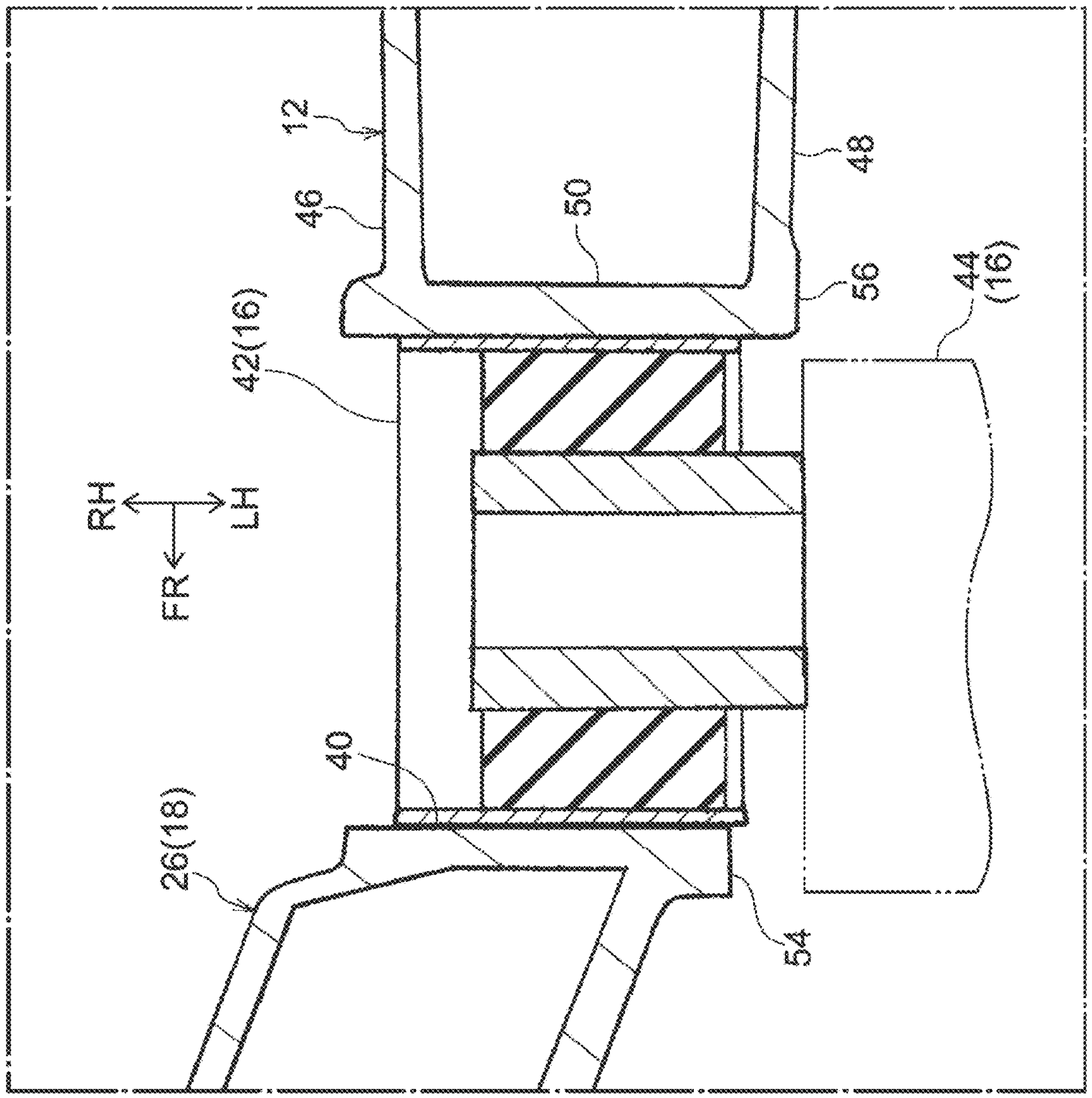
FIG. 4 is a cross-sectional view illustrating the suspension member and so forth, taken along a front-rear direction and the vehicle width direction at the portion of the side member portion on the right side, in which the attaching hole is formed.

As illustrated in FIGS. 2, 3 and 4, motor mount attaching holes 40 are formed on the rear-end sides of the upper-side intermediate member portions 26 of the right and left side member portions 18, as attaching holes that pass therethrough in the vehicle width direction. Bushings 42 that make up part of the motor mount 16 are attached by being press-fit into each of the motor mount attaching holes 40 from the outward side in the vehicle width direction. A motor mount main body 44 that makes up another part of the motor mount 16 is fixed to the bushings 42. The motor 14, which is disposed between the pair of right and left side member portions 18, is supported by the suspension member 12 via the motor mount main body 44 and the bushings 42.

As illustrated in FIG. 3, a portion at which the motor mount attaching hole 40 is formed at the rear-end side of each of the upper-side intermediate member portions 26 includes an outer wall portion 46 extending in the front-rear direction with the thickness direction thereof being the vehicle width direction, an inner wall portion 48 extending in the front-rear direction with a thickness direction thereof being the vehicle width direction, on an inward side in the vehicle width direction relative to the outer wall portion 46, and a connecting portion 50 connecting the outer wall portion 46 and the inner wall portion 48 in the vehicle width direction. The motor mount attaching hole 40 is formed so as to pass through the outer wall portion 46, the connecting portion 50, and the inner wall portion 48, in the right-left direction. The motor mount attaching hole 40 has a circular shape as viewed from the outward side or the inward side in the vehicle width direction. Further, an inner peripheral face of the motor mount attaching hole 40 is cylindrical in shape.

A stepped portion 52 that has a difference in height in the vehicle width direction is formed in the inner wall portion 48 on a downward side portion from a peripheral edge portion of the motor mount attaching hole 40. Also, a forward side of the peripheral edge portion of the motor mount attaching hole 40 across from the stepped portion 52 defines a front-side flat face portion 54 that is a flat face portion of which the face is oriented in a direction orthogonal to a direction in which the bushing 42 is press-fit into the motor mount attaching hole 40 (hereinafter referred to as the "press-fitting direction"). As viewed from the inward side in the vehicle width direction, the shape of the front-side flat face portion 54 is formed into a letter C shape that follows along the peripheral edge portion of the motor mount attaching hole 40. Also, a rearward side of the peripheral edge portion of the motor mount attaching hole 40 across from the stepped portion 52 defines a rear-side flat face portion 56 that is a flat face portion of which the face is oriented in the direction orthogonal to the press-fitting direction. As viewed from the inward side in the vehicle width direction, the shape of the rear-side flat face portion 56 is formed into a letter C shape that follows along the peripheral edge portion of the motor mount attaching hole 40. The front-side flat face portion 54 and the rear-side flat face portion 56 that are described above are formed by machining of the inner wall portion 48. Also, the front-side flat face portion 54 is offset outward in the vehicle width direction relative to the rear-side flat face portion 56. Further, the front-side flat face portion 54 and the rear-side flat face portion 56 are faces that extend parallel to each other. An angle between the front-side flat face portion 54 and rear-side flat face portion 56, and the press-fitting direction, is set to 90°.

As illustrated in FIGS. 3 and 4, in the present embodiment described above, even in a configuration in which the stepped portion 52 is formed on the peripheral edge portion of the motor mount attaching hole 40, the load that is applied when the bushing 42 is press-fit into the motor mount attaching hole 40 can be borne by abutting a jig or the like against the front-side flat face portion 54 and the rear-side flat face portion 56 that are formed on the peripheral edge portion of the motor mount attaching hole 40. This enables the bushing 42 to be press-fit into the suspension member 12 in a stable orientation. Note that the angle between the front-side flat face portion 54 and rear-side flat face portion 56, and the press-fitting direction, is not limited to 90°. The angle between the front-side flat face portion 54 and rear-side flat face portion 56, and the press-fitting direction, may be set to an angle around 90°, as long as press-fitting of the bushing 42 into the motor mount attaching hole 40 is not affected.

Also, in the present embodiment, the shape of the front-side flat face portion 54 and the shape of the rear-side flat face portion 56 are each formed into a letter C shape that follows along the peripheral edge portion of the motor mount attaching hole 40 as viewed from the inward side in the vehicle width direction. According to this configuration, the shape of the front-side flat face portion 54 and the shape of the rear-side flat face portion 56 can be suppressed from becoming large in area, as compared to a configuration in which the shape of the front-side flat face portion 54 and the shape of the rear-side flat face portion 56 are not formed into letter C shapes that follow along the peripheral edge portion of the motor mount attaching hole 40. As a result, working time required to form the shape of the front-side flat face portion 54 and the shape of the rear-side flat face portion 56 by machining can be suppressed from increasing.

Note that in the present embodiment, an example has been described in which the shape of the front-side flat face portion 54 and the shape of the rear-side flat face portion 56 as viewed from the inward side in the vehicle width direction are formed into letter C shapes that follow along the peripheral edge portion of the motor mount attaching hole 40, but the present disclosure is not limited to this. The shape of the front-side flat face portion 54 and the shape of the rear-side flat face portion 56 as viewed from the inward side in the vehicle width direction may be set as appropriate, taking into consideration the shape of the inner wall portion 48 of each of the side member portions 18, and so forth.

Although an embodiment of the present disclosure has been described above, it goes without saying that the present disclosure is not limited to the above embodiment, and that various modifications other than the above can be carried out without departing from the spirit thereof.

What is claimed is:

1. A suspension member structure comprising:

a suspension member that includes a pair of side member portions extending in a vehicle front-rear direction on both sides in a vehicle width direction, and attaching holes that are opened in and that pass through respective side member portions in the vehicle width direction; and a motor mount that is attached to the suspension member in a state in which the motor mount is press-fit into the attaching holes from an outer side in the vehicle width direction and that supports a motor, wherein stepped portions with differences in height in the vehicle width direction are fashioned at peripheral edge portions of the attaching holes, at portions of the side member portions on an inward side in the vehicle width direction, and flat face portions are provided on both sides across the stepped portions at the peripheral edge portions of the attaching holes, the flat face portions each facing in a direction orthogonal to a direction in which the motor mount is press-fit into the attaching holes.

2. The suspension member structure according to claim 1, wherein:

as viewed from the inward side in the vehicle width direction, the flat face portion that is fashioned on one side at the peripheral edge portions of the attaching holes, with the stepped portions interposed between, is fashioned in a letter C shape that follows along the peripheral edge portions of the attaching holes; and the flat face portion that is fashioned on another side at the peripheral edge portions of the attaching holes, with the stepped portions interposed between, is fashioned in a letter C shape that follows along the peripheral edge portions of the attaching holes.

* * * * *